United States Patent
Umemoto et al.

(10) Patent No.: US 7,697,265 B2
(45) Date of Patent: Apr. 13, 2010

(54) ELECTRIC DOUBLE LAYER CAPACITOR WITH A SEALING PLATE FITTED INSIDE A CONTAINER

(75) Inventors: Takashi Umemoto, Hirakata (JP); Yasuo Nakahara, Hirakata (JP); Hiroshi Nonoue, Hirakata (JP); Masaaki Nemoto, Kyoto (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 0 days.

(21) Appl. No.: 11/636,959

(22) Filed: Dec. 12, 2006

(65) Prior Publication Data

US 2007/0177333 A1 Aug. 2, 2007

(30) Foreign Application Priority Data

Jan. 31, 2006 (JP) ............................. 2006-023840
Aug. 11, 2006 (JP) ............................. 2006-219108

(51) Int. Cl.
*H01G 9/00* (2006.01)
*H01G 9/10* (2006.01)
*H01G 9/08* (2006.01)
*H01G 2/10* (2006.01)
*H05K 5/03* (2006.01)

(52) U.S. Cl. ..................... 361/502; 361/517; 361/519
(58) Field of Classification Search ................. 361/502, 361/517, 519
See application file for complete search history.

(56) References Cited

U.S. PATENT DOCUMENTS

| | | | |
|---|---|---|---|
| 5,341,969 A * | 8/1994 | Accardo et al. | 222/465.1 |
| 6,442,014 B1 * | 8/2002 | Lin | 361/301.3 |
| 6,445,566 B2 * | 9/2002 | Watanabe et al. | 361/502 |
| 6,952,339 B1 * | 10/2005 | Knowles | 361/528 |
| 7,206,193 B2 * | 4/2007 | Nagasawa et al. | 361/535 |
| 7,209,342 B2 * | 4/2007 | Matsui et al. | 361/502 |
| 7,355,841 B1 * | 4/2008 | Schmidt et al. | 361/520 |
| 2004/0157121 A1 * | 8/2004 | Watanabe et al. | 429/185 |
| 2005/0158628 A1 * | 7/2005 | Watanabe et al. | 429/245 |
| 2005/0196673 A1 * | 9/2005 | Biensan et al. | 429/231.1 |
| 2006/0035143 A1 * | 2/2006 | Kida et al. | 429/185 |
| 2007/0127190 A1 * | 6/2007 | Take | 361/517 |

FOREIGN PATENT DOCUMENTS

| | | |
|---|---|---|
| JP | 11-54387 A | 2/1999 |
| JP | 2001-216952 A | 8/2001 |

* cited by examiner

*Primary Examiner*—Eric Thomas
*Assistant Examiner*—David M Sinclair
(74) *Attorney, Agent, or Firm*—Westerman, Hattori, Daniels & Adrian, LLP (57) ABSTRACT

An electric double layer capacitor comprises an electrode, a current collector, an electrolyte, a separator, a concave-shaped container for accommodating them, and a sealing plate for sealing an opening part of the container, wherein the sealing plate is fitted inside the container. By having a structure fitting the sealing plate inside an opening part of the concave-shaped container, the positioning between the sealing plate and the container becomes easy, and the displacement of the sealing plate in the horizontal direction can be reduced. Thus, the decline of the yield can be prevented.

10 Claims, 8 Drawing Sheets

PRIOR ART

ELECTRIC DOUBLE LAYER CAPACITOR WITH A SEALING PLATE FITTED INSIDE A CONTAINER

This application is based upon and claims the benefit of priority from prior Japanese Patent Application No. 2006-023840, filed on Jan. 31, 2006 and prior Japanese Patent Application No. 2006-219108, filed on Aug. 11, 2006; the entire contents of which are incorporated herein by reference.

BACKGROUND OF THE INVENTION

1. Field of the Invention

The present invention relates to an electric double layer capacitor.

2. Description of the Related Art

Conventionally, an electric double layer capacitor is known as a device, besides a chemical cell, which accumulates electrical energy. In the electric double layer capacitor, electrodes, which are made by an electrode material having a large specific surface area such as activated carbon, and an electrolyte, are used. Those electrodes are formed to face each other, and the electrolyte forms a dielectric layer called a Helmholtz layer. Since the electric double layer capacitor accumulates the electrical energy only by movements of ions in the electrolyte, the electric double layer capacitor has an advantage that it can charge or discharge the energy quickly compared with the chemical cell, in which an oxidation reduction reaction is present during the charge or discharge. Therefore, the electric double layer capacitor is used as a power supply for backup or auxiliary power of a cellular phone or a home appliance in recent years.

Typically, such electric double layer capacitor contains an electrode body, in which a separator is formed between a pair of the electrodes, and an electrolyte in a coin type metal can container. When the coin type capacitor is used as the power supply for the backup or auxiliary power, the capacitor is mounted on a printed circuit board by soldering. When mounting the capacitors, it is necessary to attach a terminal to the can container by welding etc. Therefore, there was a problem that a cost of parts and manufacturing are expensive. Moreover, when the can container is the coin type, there was a problem that a dead space tends to exist when mounting, because it is in a circular shape. Thus, the parts can not be mounted on the printed circuit board with high density.

Therefore, in recent years, an electric double layer capacitor using a concave-shaped container having a terminal for soldering is proposed (for example, refer to JP2001-216952). In such electric double layer capacitor, the concave-shaped container is made of ceramics or resins. After an electrode body and an electrolyte are contained in the container, a sealing plate is placed on the edge of an opening part of the container. Then, the opening part is sealed by adhering using brazing metals.

However, according to such conventional technology, since the sealing plate is provided on the edge of the opening of the container, the sealing plate and the container are easy to shift in a horizontal direction when sealing. As a result, a decline of the yield has been caused.

SUMMARY OF THE INVENTION

One aspect of an electric double layer capacitor of the present invention comprises: an electrode body where a separator is formed between a pair of electrodes; an electrolyte; a concave-shaped container for containing the electrode body and the electrolyte; and a sealing plate for sealing an opening part of the container. The sealing plate is fitted inside the container.

The container may be made of ceramics, and the sealing plate may be made of a metal.

A part of the side surface of the sealing plate may be exposed from the concave-shaped container.

The electric double layer capacitor may have an external connecting terminal placed on a surface of a wall portion of the container. The terminal may be connected electrically to at least one of the electrodes of said pair of electrodes, penetrating through the wall portion. In the present invention, the "wall portion" of the container means a bottom wall portion and/or side wall portion of the container and the terminal may be formed at least in one of the bottom wall portion or the side wall portion of the container. Similarly, the terminal and the electrode may be connected penetrating at least one of the bottom wall portion or the side wall portion. The connection between the terminal and the electrode need not be connected directly to each other, but they may be connected through the other electric conduction materials also.

According to the above aspect of the electric double layer capacitor of the present invention, by fitting the sealing plate inside the concave-shaped container, the positioning between the sealing plate and the container becomes easy, and a displacement of the sealing plate in the horizontal direction can be reduced. Therefore, the decline of the yield can be prevented.

By making the container of ceramics, a shape deformation of the container due to heat can be reduced, when executing the sealing by heating such as welding. Thus, a decline of the sealing reliability can be reduced.

By making the sealing plate of a metal, the sealing becomes easy because the heat is easily transmitted when executing the sealing by heating such as welding. Additionally, it becomes possible to pass a current by contacting a welding electrode to the sealing plate, when welding under a principle of resistance welding, such as a seam welding. At this point, in order to make an area where the sealing plate and the welding electrode contact is small, it is desirable to contact the welding electrode to the meeting part of an upper face and a side surface of the sealing plate. Accordingly, in order to contact the welding electrode to the meeting part of the sealing plate easily, it is desirable that a part of the side surface of the sealing plate is exposed from the container.

When the external connecting terminal is formed on the surface of the wall portion of the concave-shaped container, by performing the connection between the terminal and the electrode in the container penetrating through the wall portion, it becomes unnecessary to wire on the sealing part, where the container and the sealing plate are fitted. Thus, there are less restrictions on the materials which may be used for the sealing part and the sealing method. Accordingly, the sealing reliability at the sealing location can be improved.

The features and the advantages of the present invention will be apparent from descriptions of following embodiments. However, the following embodiments are examples of the present invention. The meaning of present invention or vocabularies of each structure in the claims are not restricted to what is indicated in following embodiments.

BRIEF DESCRIPTION OF THE DRAWINGS

FIG. 5A, FIG. 5B, and FIG. 5C are figures describing an electric double layer capacitor 500 of the fifth example.

FIG. 7A, FIG. 7B, and FIG. 7C are figures describing the electric double layer capacitor 800 of the sixth example.

FIG. 8A, FIG. 8B, and FIG. 8C are figures describing the electric double layer capacitor 900 of the seventh example.

DESCRIPTION OF THE PREFERRED EMBODIMENTS

Hereafter, the embodiments of present invention are described accompanying the drawings.

First Example

Figure 1:
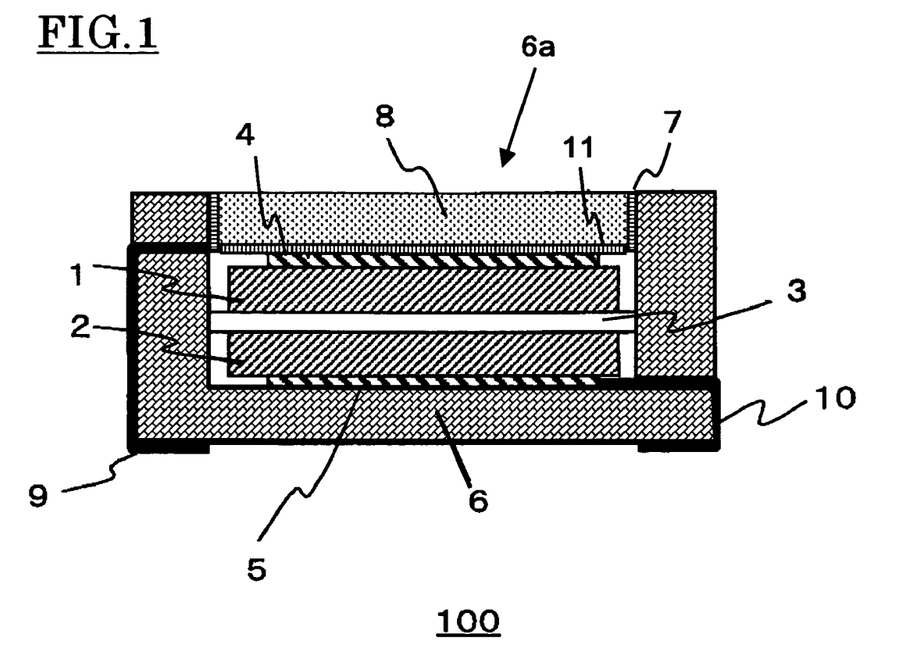
FIG. 1 is a figure describing an electric double layer capacitor of the first example.

FIG. 1 shows the structure of the electric double layer capacitor 100 of the first example. Here, 1 is a first electrode, 2 is a second electrode, 3 is a separator, 4 is a first current collector, 5 is a second current collector, 6 is a concave-shaped container, 6a is an containing space, 7 is a first metal layer, 8 is a sealing plate, 9 is a first external connecting terminal, 10 is a second external connecting terminal, and 11 is a second metal layer.

The concave-shaped container 6 is a frame object made from alumina, having a square shaped undersurface of 5 mm on each side, and height of 1.6 mm. On the upper surface side of the container 6, a concave shaped containing space 6a having 3.6 mm on each side square and depth of 1.4 mm is formed. On the bottom part of the unit 6a, the current collector 5, where gold is coated on tungsten, is formed.

On an undersurface of a bottom wall portion and on an external surface of the side wall portion of the concave-shaped container 6, the external connecting terminals 9 and 10, consisting of gold (Au) are formed. Here, the bottom wall portion and the side wall portion of the container 6 are examples of "wall portion" of the present invention. The first external connecting terminal 9 is extended to an internal surface of the containing space 6a, by penetrating through the side wall portion of the container 6 at a position which is 0.3 mm below the top edge of the opening part of the container 6, and is connected electrically with the sealing plate 8 which is fitted to the opening part of the container 6. The second external connecting terminal 10 is extended to the bottom part of the containing space 6a, by penetrating through the side wall portion of the container 6, and is connected electrically with the second current collector 5.

On an internal surface of the concave-shaped container 6, the first metal layer 7 comprising an alloy such as iron (Fe)-nickel (Ni)-cobalt (Co) alloy (for example, a 29Ni-17Co-54Fe alloy (kovar) having a close thermal expansion coefficient with an alumina) is formed on an area where the sealing plate 8 and the container 6 contact each other when the sealed. The first metal layer 7 may be formed to a depth corresponding to a thickness of the sealing plate 8, from the upper edge of the opening part. The first metal layer 7 and the external connecting terminal 9 are electrically connected on the internal surface of the container 6. The first metal layer 7 may be a multilayered metal which comprises the kovar layer mentioned above and a gold coated layer formed on the kovar layer, for example.

The electrodes 1 and 2 are produced by a pressurization fabrication after adding and mixing 5 part-by-weight of acetylene black and 5 part-by-weight of poly-tetra-fluoroethylene per 100 part-by-weight carbon powders having a specific surface area of 2000 m$^2$/g. The electrodes have 3.5 mm on each side square shaped and have a thickness of 0.5 mm.

Furthermore, an electrode body, having a separator 3 between a pair of electrodes 1 and 2, is constructed by mediating the separator 3, which is made from a glass fiber having a 0.1 mm thickness, between two electrodes 1 and 2. As shown in FIG. 1, the electrode body is contained in the containing space 6a comprises the second electrode 2, the separator 3, and the first electrode 1 from the bottom to the top. The second electrode 2 is electrically connected to the second current collector 5 placed in the bottom of the containing space 6a. In the containing space 6a, an electrolyte (which is not illustrated) is poured, and the solution is fully impregnates the electrodes 1 and 2 which are permeable. The electrolyte is made by dissolving a dissolved substance of tetra-ethyl-ammonium tetra-fluoroborate $(C_2H_5)_4NBF_4$ in a nonaqueous medium of propylene carbonate, so the concentration of the tetra-ethyl-ammonium tetra-fluoroborate becomes 1 mol/l.

The sealing plate 8 consists of a metal plate of an alloy such as Fe—Ni—Co alloy (kovar for example) having a 3.6 mm width, 3.6 mm depth and 0.3 mm thickness. On the undersurface of the sealing plate 8, the first current collector 4, which is gold coated on tungsten, is formed. The sealing plate 8 is fitted inside an opening part of the concave-shaped container 6 so that the first current collector 4 and the first electrode 1 can contact, and so that a side surface of the sealing plate 8 can contact the first metal layer 7. Furthermore, by melting the first metal layer 7 by seam welding etc, the container 6 and the sealing plate 8 are sealed tightly. Thus, the opening part of the container 6 is sealed. As described above, the electric double layer capacitor 100 of the first example of the present invention is configured.

According to the first example, by having a structure fitting the sealing plate 8 inside the opening of the concave-shaped container 6 as mentioned above, the positioning between the sealing plate 8 and the container 6 becomes easy, and can reduce a displacement in the horizontal direction of the sealing plate 8. Thus, the decline of the yield can be prevented. Furthermore, it becomes easy to satisfy the requirements of: (i) contacting the second electrode 2 and the second current collector 5, and (ii) contacting the first current collector 4 and the first electrode 1, without a strict requirement on the distance between the sealing plate 8 and the bottom face of the containing space 6a of the container 6.

According to present example, an electricity conducting route from the first external connecting terminal 9 to the first electrode 1 via the first metal layer 7, the sealing plate 8, and the first current collector 4 is formed. Additionally, in the present example, since the first metal layer 7, which is melted while sealing the opening part of the container 6, is contacted to an end part of the first external connecting terminal 9 and the second metal layer 11 formed on an undersurface of the sealing plate 8, an electrical connection between the first external connecting terminal 9 and the sealing plate 8 is ensured.

As described above, the sealing of the sealing plate 8, which is fitted inside the concave-shaped container 6, can be achieved by laser welding, or ultrasonic welding, etc. besides seam welding. Adhesives such as an epoxy resin can be used, instead of placing the first metal layer 7 or the second metal layer 11 in a portion where the container 6 and the sealing plate 8 contact each other.

Second Example

Figure 2:
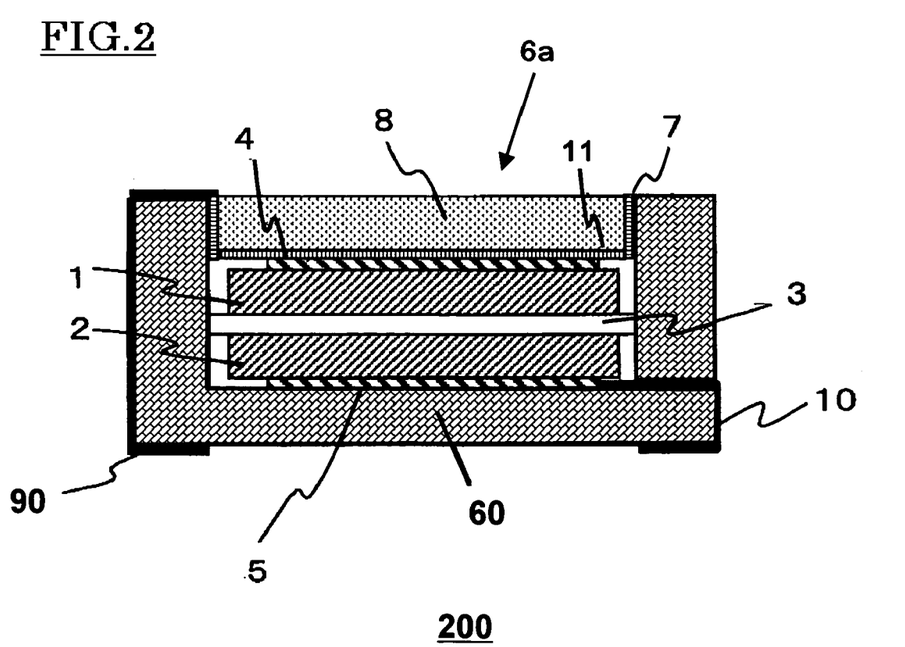
FIG. 2 is a figure describing an electric double layer capacitor of the second example.

As shown in FIG. 2, in an electric double layer capacitor 200 of the second example, a first external connecting terminal 90 is formed along the external surface of the concave-shaped container 60 from the bottom end to the upper end, and the first external connecting terminal 90 is extended to the internal surface of the concave-shaped container 60 along an edge part of the opening part. This is an alternative to the first external connecting terminal 9 of the capacitor 100 in the first example which penetrated through the side wall portion of the concave-shaped container 6. A first metal layer 7, which is on an internal surface of the containing space 6a, is formed so that it can cover the first external connecting terminal 90. Except the above, the capacitor 200 of the second example has same configurations as the capacitor 100, and the same numbers are attached in the figure for the same configurations.

According to the present example, by having a structure fitting the sealing plate 8 inside an opening part of the concave-shaped container 60, the positioning between the sealing plate 8 and the container 60 becomes easy, and the displacement of the sealing plate 8 in the horizontal direction can be reduced, similarly as the previous example. Thus, the decline of the yield can be prevented. Furthermore, it becomes easy to satisfy the requirements of (i) contacting the second electrode 2 and the second current collector 5; and (ii) contacting the first current collector 4 and the first electrode 1; without a strict accuracy requirement on the distance between the sealing plate 8 and the bottom surface of the container 60.

Third Example

Figure 3:
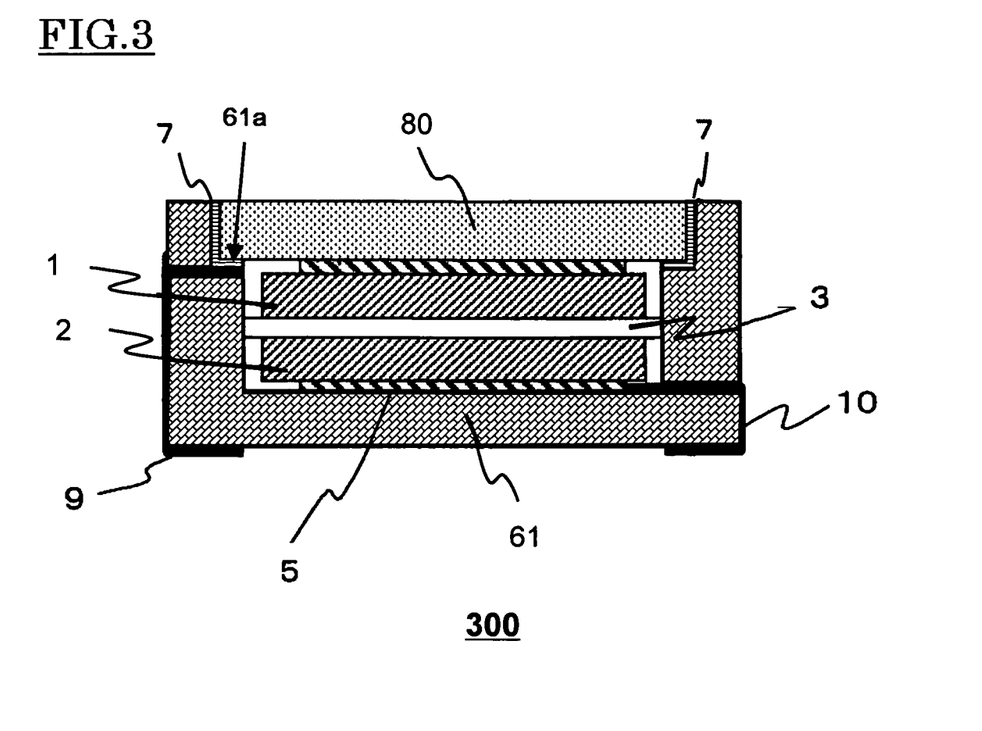
FIG. 3 is a figure describing an electric double layer capacitor of the third example.

As shown in FIG. 3, in the electric double layer capacitor 300 of the third example, a level difference part 61a forms an internal surface of the concave-shaped container 61. In other words, the containing space of the container 61 has a lower containing space having a square shaped surface of 3.6 mm on each side and 1.1 mm depth and an upper containing space having a square shaped surface of 4 mm on each side and 0.3 mm depth. When viewing the part 61a from the upper surface side, the part 61a looks like a square strip shaped object, where the width of the strip is 0.2 mm. The external connecting terminal 9, which penetrates through the side wall of the container 61, is formed extending to the part 61a. The external connecting terminal 9 may be extended to an inner edge part of the level difference part 61a. The first metal layer 7 is formed on an area contacting with a sealing plate 80 when sealing to the internal surface of the container 61 and on the part 61a. The first metal layer 7 is formed to cover the terminal 9 in an area of the part 61a, where the terminal 9 is formed. The sealing plate 80 is a metal plate, having a square shaped surface of 4 mm on each side and 0.3 mm thickness, and is fitted to the upper containing space so that it contacts both the upper surface of the part 61a of the containing space and the upper surface of the current collector 4. Except the above, the capacitor 300 of the third example has the same configuration as the capacitor 100 of the first example, and the same numbers are attached in the figure for the same configurations.

According to the present example, by having a structure fitting the sealing plate 80 inside near an opening part of the concave-shaped container 61, the positioning between the sealing plate 80 and the container 61 becomes easy, and the displacement of the sealing plate 80 in the horizontal direction can be reduced, similarly as the previous example. Thus, the decline of the yield can be prevented. Furthermore, the distance between the sealing plate 80 and the bottom surface of the container 61 is in a dimension satisfying the requirements of (i) contacting the second electrode 2 and the second current collector 5; and (ii) contacting the first current collector 4 and the first electrode 1.

In the present example, by heat sealing the concave-shaped container 61 and the sealing plate 80 also on the level difference part 61a, a more reliable sealing can be performed.

Furthermore, in the present example, since the sealing plate 80 and the external connecting terminal 9 are placed so that they overlap each other on the level difference part 61a, mediating a first metal layer 7, a more reliable electrical connection between the sealing plate 80 and the terminal 9 can be performed.

Fourth Example

Figure 4:
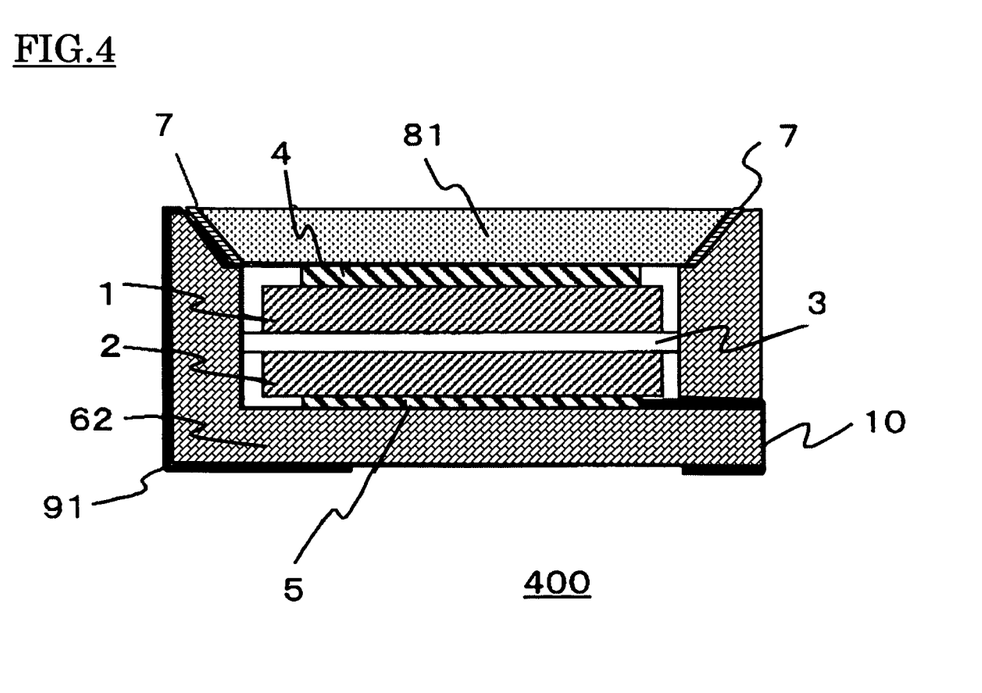
FIG. 4 is a figure describing an electric double layer capacitor of the fourth example.

As shown in FIG. 4, in the electric double layer capacitor 400 of the fourth example, the side surface of a sealing plate 81 is formed in a tapered shape. The sealing plate 81 has a square shaped upper surface having 4.2 mm on each side and a square shaped undersurface having 3.8 mm on each side, and its thickness is 0.3 mm. The concave-shaped container 62 is formed in a tapered shape at the edge part of the opening part, so that it fits to the shape of the side surface of the sealing plate 81. In other words, the container 62 is made so that the opening part spreads as it gets closer to the upper surface. The first external connecting terminal 91 is formed along the edge of the opening part of the container 62, and is extending to the taper shaped internal surface of the container 62. The first metal layer 7 is formed on the taper shaped internal surface. Except the above, the capacitor 400 of the fourth example has the same configuration as the capacitor 100 of the first example, and the same numbers are attached in the figure for such configurations.

According to the present example, by having a structure fitting the sealing plate 81 inside near an opening part of the concave-shaped container 62, the positioning between the sealing plate 81 and the container 62 becomes easy, and the displacement of the sealing plate 81 in the horizontal direction can be reduced, similarly as the previous example. Thus, the decline of the yield can be prevented. Furthermore, the distance between the sealing plate 81 and the bottom face of the container 62 is in a dimension satisfying the requirements of (i) contacting the second electrode 2 and the second current collector 5; and (ii) contacting the first current collector 4 and the first electrode 1.

Furthermore, in the present example, since the edge part of the opening part of the concave-shaped container 62 is formed so that the opening part spreads as it gets closer to the upper surface side, the sealing plate 81 can be easily fit to the inside of the container 62.

Fifth Example

Figure 5A:
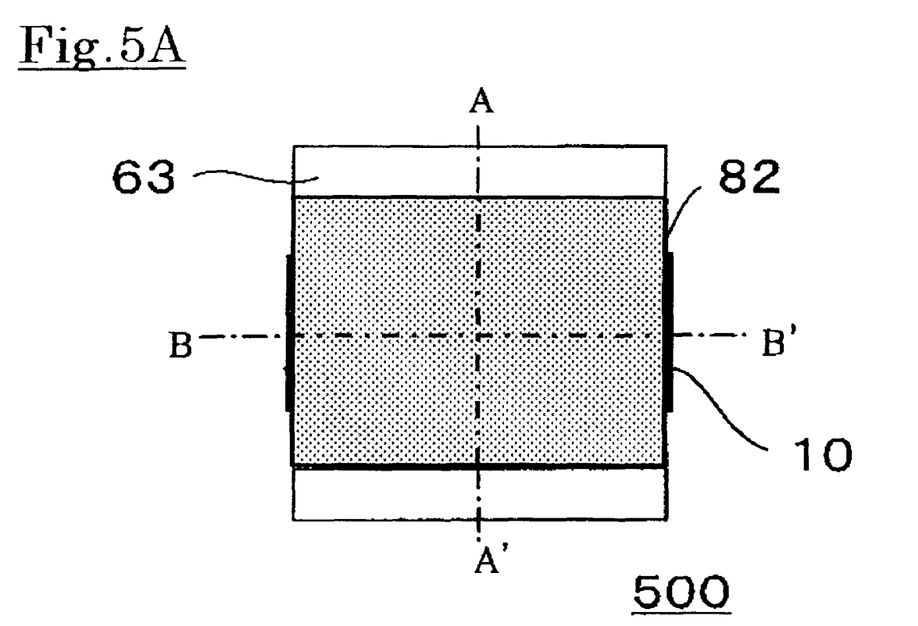
FIG. 5A is a plan view of the capacitor 500.
Figure 5B:
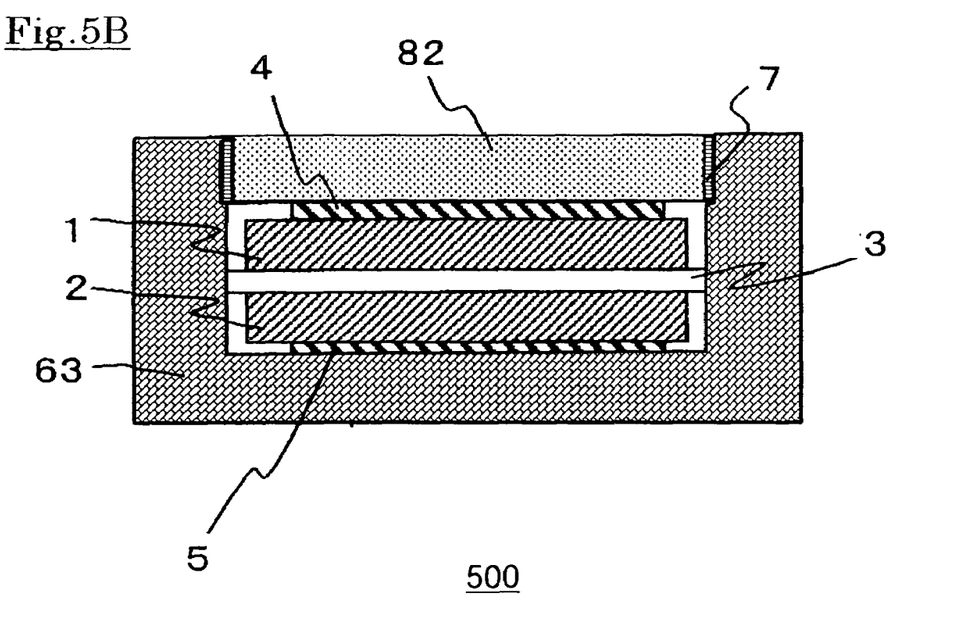
FIG. 5B is the A-A' (see FIG. 5A) cross-sectional view of the capacitor 500.
Figure 5C:
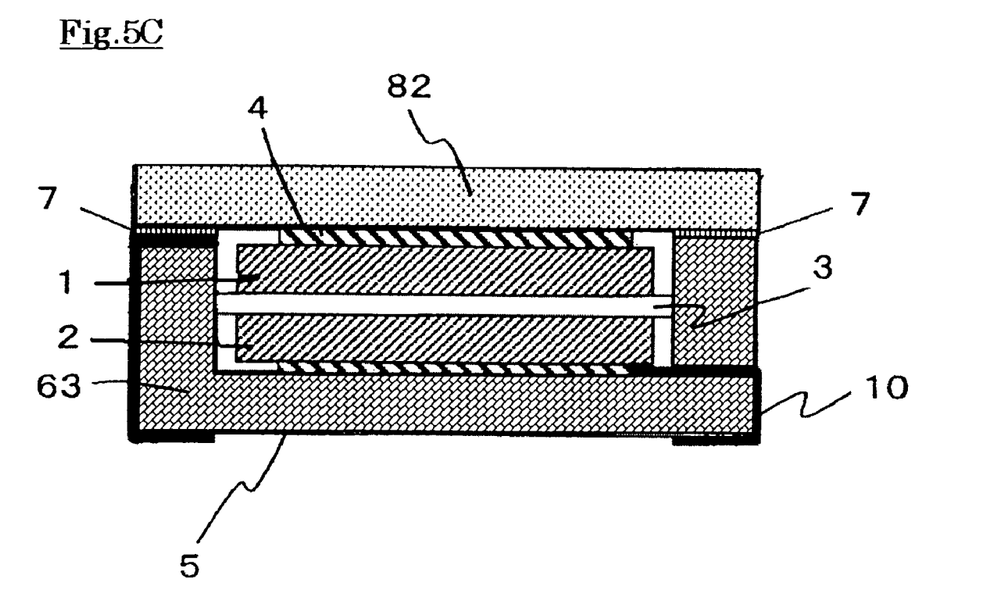
FIG. 5C is the B-B' (see FIG. 5A) cross-sectional view of the capacitor 500.

FIG. 5A is a plan view of the electric double layer capacitor 500 of the fifth example. FIG. 5B is the A-A' (see FIG. 5A)

cross-sectional view of the capacitor 500. FIG. 5C is the B-B' (see FIG. 5A) cross-sectional view of the capacitor 500. As shown in these figures, in the capacitor 500 of the fifth example, a concave-shaped container 63 is formed to include a first pair of countering side wall portions, the first pair of countering side wall portions being lower than a second pair of countering side wall portions. The sealing plate 82 is fitted inside the concave-shaped container 63 so that it can be placed between the second pair of countering side wall portions, covering the first pair of countering side wall portions. The first pair of countering side wall portions, which are covered by the sealing, have a length of 3.6 mm. The sealing plate 82 is 5 mm wide, 3.6 mm long and 0.3 mm high. The first metal layer 7 is formed on the internal surface of the second pair of countering side wall portion of the container 63, where they contact with a side surface of the sealing plate 82, and the upper surface of the first pair of countering side wall portions where they contact with the bottom surface of the sealing plate 82. In other words, the first metal layer 7 is formed on the internal surface of the side wall portions having a higher height, and on the upper surface of the side wall portions having a lower height. Except the above, the capacitor 500 of the fifth example has the same configuration as the capacitor 100 of the first example, and the same numbers are attached in the figure for the same configurations.

According to the present example, by having a structure fitting the sealing plate 82 inside an opening part of the concave-shaped container 63, the positioning between the sealing plate 82 and the container 63 becomes easy, and the displacement of the sealing plate 82 in the horizontal direction can be reduced easily, similarly as the previous example. Thus, the decline of the yield can be prevented. Furthermore, the distance between the sealing plate 82 and the bottom surface of the container 63 is in a dimension satisfying the requirements of: (i) contacting the second electrode 2 and the second current collector 5; and (ii) contacting the first current collector 4 and the first electrode 1.

In the present example, a pair of countering side surfaces of the sealing plate 82, which is fitted inside the concave-shaped container 63, are exposed from the container 63. Thus, it becomes easy to contact the welding electrode to the meeting part of the upper surface and a side surface when welding the sealing plate 82 to the container 63 by seam welding etc. As a result, the sealing plate 82 can be welded easily, and the sealing reliability can be improved.

First Comparative Example

Figure 6:
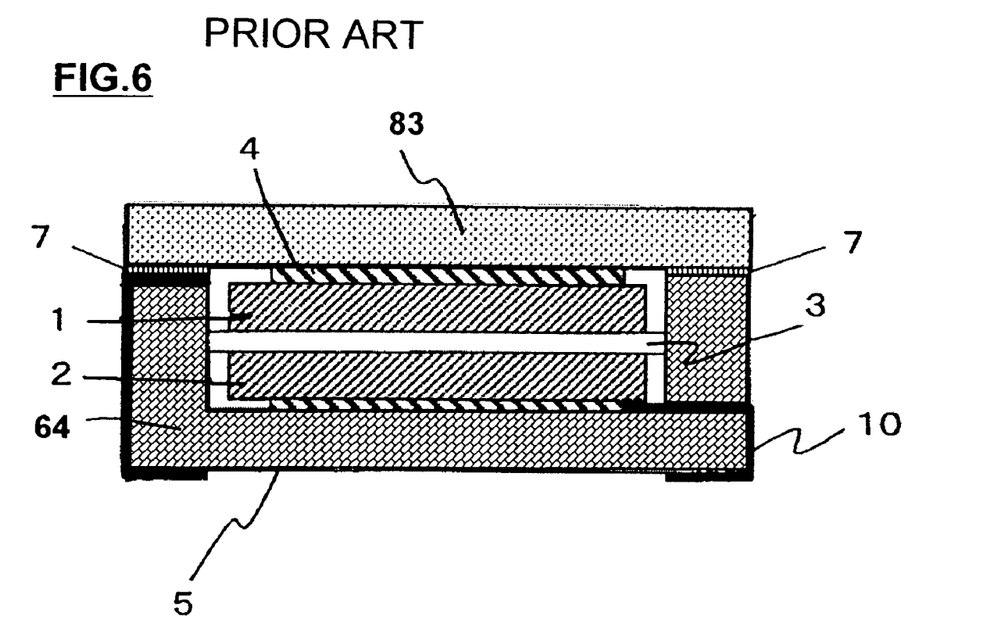
FIG. 6 is a figure describing an electric double layer capacitor of the first comparative example.

As shown in FIG. 6, in the electric double layer capacitor 600 of the first comparative example, the sealing plate 83 is placed on the edge part of the opening part of the concave-shaped container 64; instead in the capacitor 100 of the first example where the sealing plate 8 is fitted inside the concave-shaped container 6. The first metal layer 7 is formed on upper an edge part of the opening part of the container 64. By heat bonding (i.e. by seam welding etc.) the first metal layer 7, the container 64 and the sealing plate 83 are tightly sealed. Thus, the opening part of the container 64 is sealed. The depth of the containing space of the container 64 is 1.1 mm. Except the above, the capacitor 600 of the first comparative example has the same configuration as the capacitor 100 of the first example, and the same numbers are attached in the figure for the same configurations.

Second Comparative Example

In the electric double layer capacitor (not shown) in the second comparative example, the sealing between the concave-shaped container, which is made of liquid crystal polymers, and the sealing plate is done by an epoxy adhesive, instead of by the metal layer. Additionally, in the capacitor, the first external connecting terminal and the first current collector are directly connected by extending the first current collector to the taper shaped side surface of the sealing plate. Except the above, the capacitor has the same configuration as the capacitor 400 of the fourth example.

Experiment

We have manufactured seven kinds of electric double layer capacitor of the above examples (i.e. the capacitors of the first to fifth examples, and the capacitors of the first and second comparative examples) and then conducted the following experiments.

First, an internal resistance value (Ω) of each electric double layer capacitors was measured by applying an alternating current having an amplitude of 0.1 mA, and a frequency of 1 kHz to each capacitor in 25 degrees Celsius atmosphere. Hereafter, the internal resistance value measured as above is defined as an "initial characteristic". The measurement was done for 20 samples per each kind of the above capacitors. The capacitor having a resistance value greater than 100Ω in the initial characteristic is defined as an "inferior capacitor".

Next, 200 cycles of charge-discharge cycle examination was done for the "superior capacitors", which are not "inferior capacitors". In each of the charge-discharge cycle, the capacitors are charged for one hour under a fixed voltage of 3.3 V, and then they are discharged to 1.0 V with a fixed current of 2 mA in 25 degree Celsius atmosphere. The examination was done for the capacitors except the inferior capacitors. After the charge-discharge cycle examination, the internal resistance values were measured.

TABLE 1 shows the number of the inferior capacitors and the average values of the internal resistance of the superior capacitors (i.e. the initial characteristics, and the resistance value after the charge-discharge cycle) for each kind of capacitors.

TABLE 1

| | Numbers of inferior capacitors | Internal resistance (Ω) | |
| --- | --- | --- | --- |
| | | Initial characteristics | After 200 cycles |
| first example: capacitor 100 | 0 | 30 | 75 |
| second example: capacitor 200 | 1 | 35 | 85 |
| third example: capacitor 300 | 0 | 33 | 77 |
| fourth example: capacitor 400 | 1 | 38 | 83 |
| fifth example: capacitor 500 | 2 | 35 | 85 |
| first comparative example: capacitor 600 | 8 | 38 | 85 |
| second comparative example: capacitor 700 | 4 | 75 | 540 |

According to the table, the numbers of the inferior capacitors are reduced remarkably in the capacitors of the first to fifth examples of the present invention, compared with those of the comparative examples. It can be considered that since the sealing plate is placed "inside" the concave-shaped container, not "on" the container, compared with the first comparative example, the positioning between the sealing plate and the container becomes easy and the displacement of the sealing plate in the horizontal direction is reduced, and the sealing reliability has improved. Moreover, compared with the capacitors of the second comparative example, the number of the inferior capacitors of the fourth example is reduced remarkably. It can be considered that since the sealing between the containers and the sealing plates is done by welding, instead of sealing by adhesives as in the second comparative example, the sealing of the capacitors of the fourth example is improved.

Furthermore, the initial characteristics (i.e. an average value of the internal resistance value of the superior capacitors) and the internal resistance after the charge-discharge cycle examinations are reduced in the capacitors of the first to fifth examples, compared with those of the comparative examples. Moreover, compared with the second comparative example, the initial characteristics and the resistance after the cycle examination are reduced remarkably in the capacitor of the fourth example. It can be considered that since the container and the sealing plate are sealed by welding in the capacitors of the fourth example, instead of the sealing by adhesives as in the second comparative example, the sealing has improved in the capacitors of the fourth example.

It can be considered that when the reliability of the sealing declines, the initial characteristics and a resistance after charge-discharge cycle examination becomes high, because of a leakage of the electrolyte or a degradation of the electrode etc. When mounting the electric double layer capacitor to the substrate, since the capacitors are heated because of soldering or reflowing process etc., the degradation of capacitors may happen more significantly.

Sixth Example

Figure 7A:
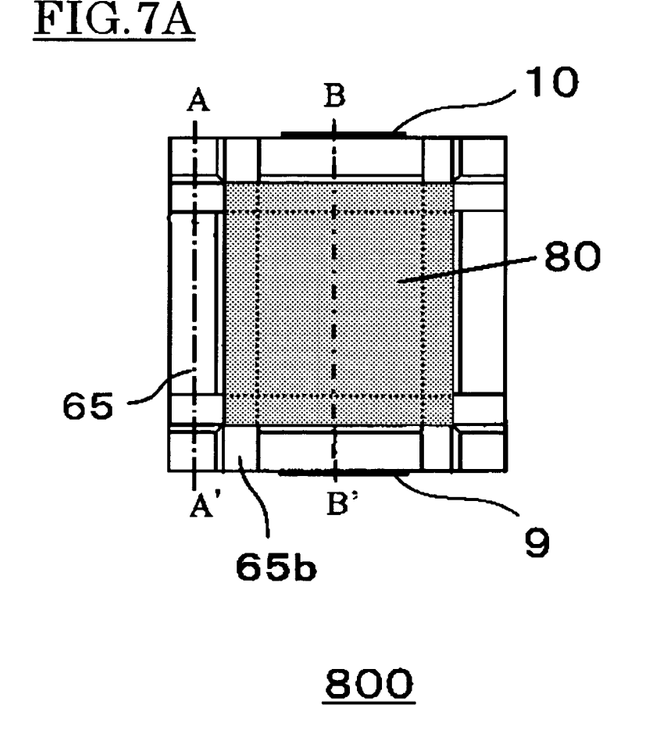
FIG. 7A is a plan view of the capacitor 800.
Figure 7B:
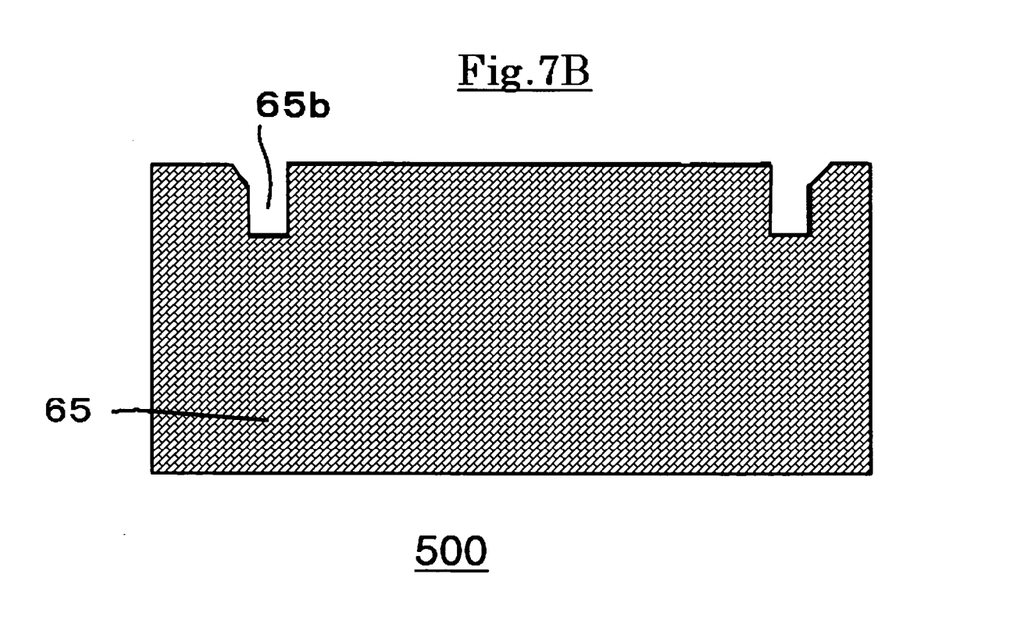
FIG. 7B is the A-A' (see FIG. 7A) cross-sectional view of the capacitor 800.
Figure 7C:
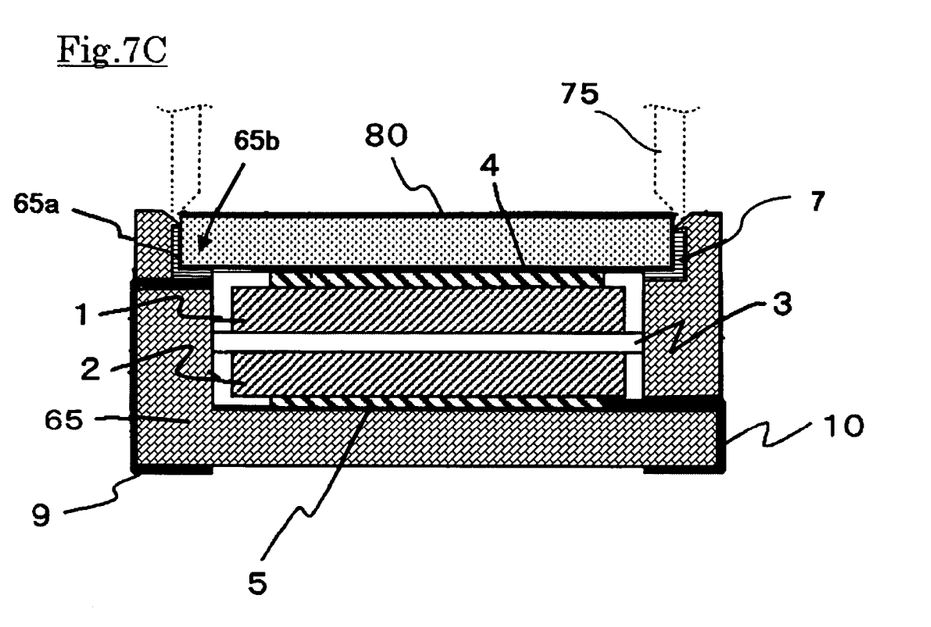
FIG. 7C is the B-B' (see FIG. 7A) cross-sectional view of the capacitor 800.

As shown in FIG. 7A, FIG. 7B, and FIG. 7C, in the electric double layer capacitor 800 of the sixth example, groove portions 65b, arranged in the lattice shape, are formed on an upper surface of the container 65. Each of the groove portions 65b have 0.2 mm width and 0.3 mm depth, and is formed in the direction parallel to each of the side wall portions. In the opening side of the containing space of the container 65, which is surrounded by the groove portions 65b, the upper containing space and level difference part 65a (corresponding to the bottom of the groove portion) is formed, such as in the third example. In the upper containing space, the sealing plate 80 is fitted. Additionally, the meeting part of the containing space facing-side surface and the upper surface of the container 65 is in a tapered shape so that each side surfaces of the sealing plate 80 are exposed from the container 65. Except the above, the capacitor 600 of the sixth example has the same configuration as the capacitor 300 of the third example, and the same numbers are attached in the figures for the same configurations.

In the present example, since the side surface of the sealing plate 80, which is fitted inside the concave-shaped container 65, is exposed from the container 65 as mentioned above, a welding electrode 75 (shown in dashed lines in FIG. 7C), used for seam welding etc., can be easily contacted to the meeting part of the upper surface and the side surface of the sealing plate 80. Therefore, the sealing plate 80 can be welded easily. Furthermore, in the present example, not only the area where the sealing plate 80 is fitted, but also the each of the above mentioned meeting parts in the container 65 (i.e. the meeting part of the containing space side surface of the groove portion 65b, and the upper surface of the container 65) are formed in the tapered shape. Therefore, it is easy to move a roller-like welding electrode 75, by rolling around the upper surface of the sealing plate 80, pressing it to the corner part of the sealing plate 80. According to the present example, the seam welding of each side of the sealing plate 80 can be done easily, thus the sealing reliability can be improved. Moreover, time necessary for the sealing can be shortened, thus the manufacturing cost can be reduced.

Seventh Example

Figure 8A:
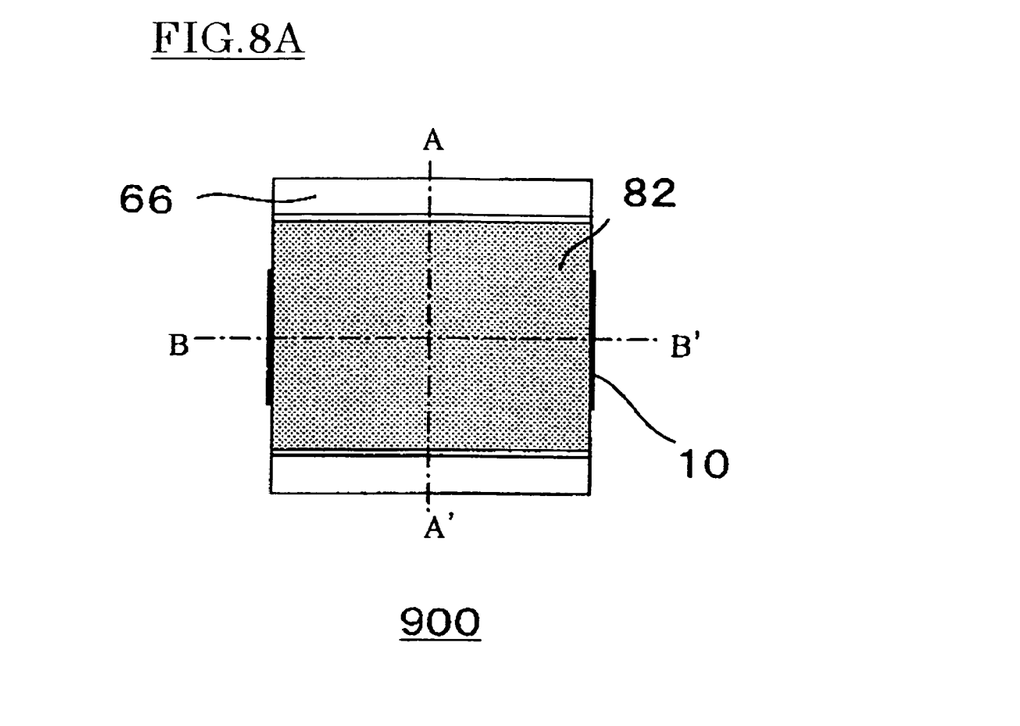
FIG. 8A is a plan view of the capacitor 900.
Figure 8B:
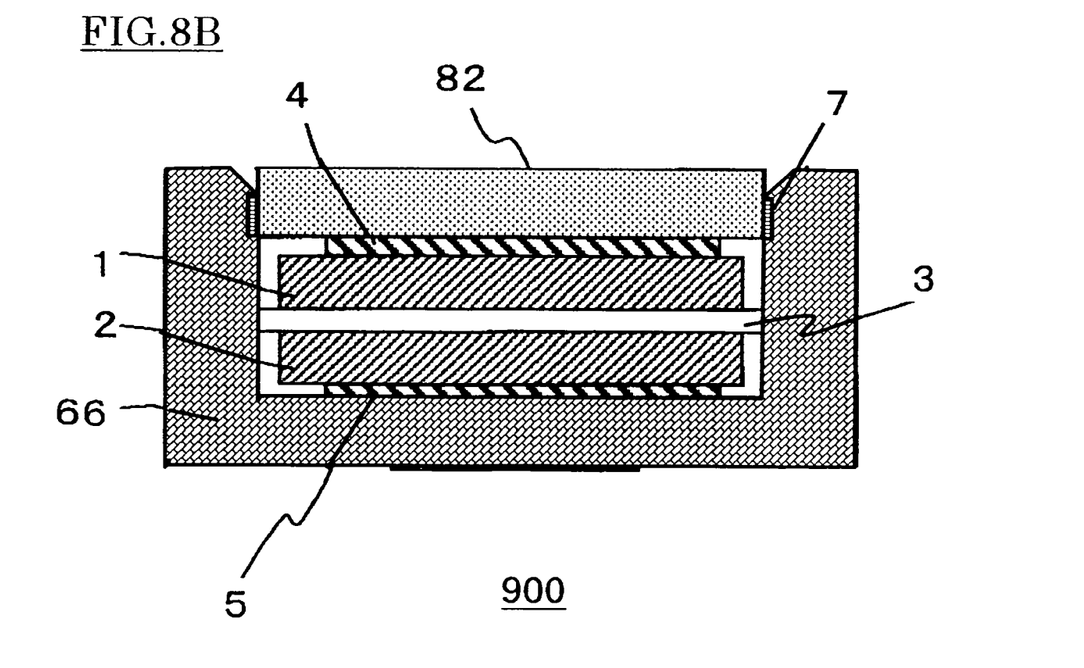
FIG. 8B is the A-A' (see FIG. 8A) cross-sectional view of the capacitor 900.
Figure 8C:
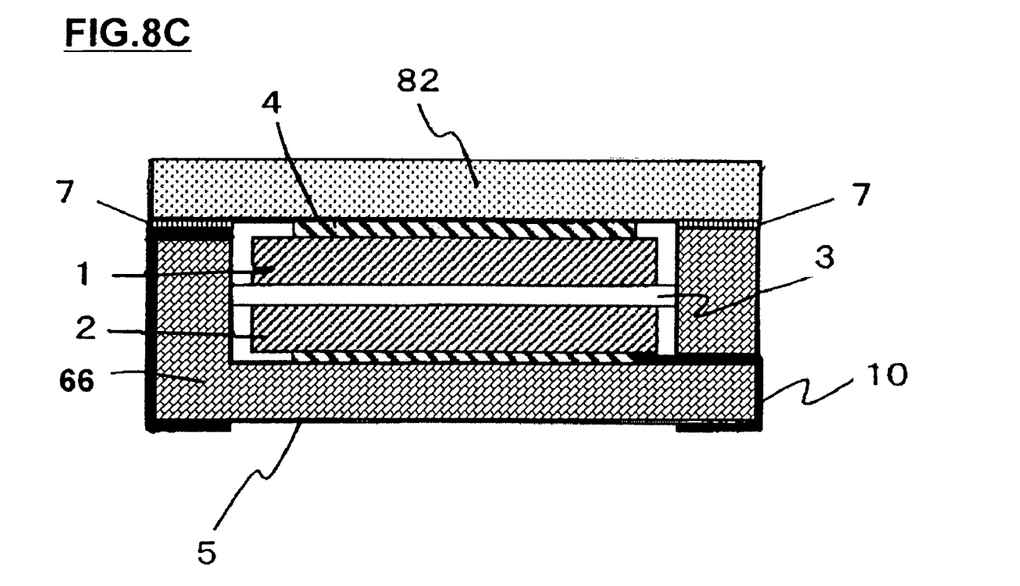
FIG. 8C is the B-B' (see FIG. 8A) cross-sectional view of the capacitor 900.

As shown in FIG. 8A, FIG. 8B, and FIG. 8C, in the electric double layer capacitor 900 of the seventh example, the meeting part of the internal surfaces and the upper surfaces of the concave-shaped container 66 are formed in tapered shape, so that the side surfaces of the sealing plate 82, which is fitted inside the container 66, can be exposed from the container 66 at the container's internal surface. Except the above, the capacitor 900 of the seventh example has the same configuration as the capacitor 500 of the fifth example, and the same numbers are attached in the figures for the same configurations.

According to the seventh example, since the side surface of the sealing plate 82, which is fitted inside the container 66, are exposed from the container 66, similarly as in the sixth example, the welding electrode used for seam welding etc. can be easily contacted to the meeting parts of the upper surface and the side surface of the sealing plate 82, as in the sixth example. Therefore, the sealing plate 82 can be welded easily.

The embodiments described above are intended to illustrate the present invention and should not be construed as limiting the invention set forth in the appended claims or reducing the scope there of. The devices of the inventions are not limited to the foregoing embodiments in construction but can of course be modified variously within the technical scope defined in the claims.

For example, in each of the examples mentioned above, the first current collector 4 is formed on the undersurface of the sealing plate. But the scope of the present invention is not limited to such examples only, for instance, the sealing plate itself may serve as the first current collector 4. Thus, electrical connections between the first electrode 1 and each of the external connecting terminals can be made, by using a sealing plate having high conductivity such as metal plate, without forming the first current collector 4.

Moreover, in each of the examples mentioned above, the sealing of a concave-shaped container and a sealing plate is done by welding, but the scope of the present invention is not limited to such examples, for instance, the sealing may be done by soldering or wax attachment.

In each of the examples mentioned above, the concave-shaped container and the sealing plate are placed intermediating the first metal layer 7, but the scope of the present invention is not limited to such examples. For instance, a seal ring made from a kovar etc. may be placed between the container and the sealing plate. In this case, it is desirable to braze the seal ring to the container by welding etc., in advance, and it is desirable to form at least one of a nickel coated layer or a gold coated layer on the area where the seal ring and the sealing plate contact.

In the sixth and seventh examples mentioned above, the meeting part in the opening part is formed in a tapered shape, so that the side surface of a sealing plate can expose from the concave-shaped container. But the scope of the present invention is not limited to such examples only, for instance, the meeting part may be formed in other shapes besides the tapered shape, or the sealing plate may be fitted shallowly to let the upper surface of the sealing plate stand out (bump out) from the upper surface of the concave container, so that the side surface of the sealing plate can be exposed from the container.

The invention claimed is:

1. An electric double layer capacitor, comprising:
   an electrode body comprising a separator formed between a pair of electrodes;
   an electrolyte;
   a concave-shaped container for containing the electrode body and the electrolyte; and
   a sealing plate for sealing an opening part of the container, the sealing plate having a plate shape comprising an upper surface, a lower surface and side surfaces,
   wherein the sealing plate is made of a metal,
   wherein a first external connection terminal and a second external connection terminal are formed on an external side surface of the container,
   wherein the container includes a level difference part on an internal surface of the container, and
   wherein the first external connection terminal is extended to the level difference part, and
   wherein the side surfaces of the sealing plate are bonded, via a metal layer, to the inside of the container and a first part of an undersurface of the sealing plate is bonded, via the metal layer to the level difference part and a second part of the undersurface of the sealing plate is configured to contact a current collector formed on one of the pair of electrodes.

2. The capacitor of claim 1,
   further comprising a first electrode and a second electrode constituting the pair of electrodes,
   wherein the first external connection terminal and the second external connection terminal penetrate through a side wall of the container and extends to an internal side surface of the container,
   wherein the first external connection terminal is electrically connected to the sealing plate at the internal side surface of the container, and
   wherein the first external connection terminal is electrically connected to the first electrode and the second external connection terminal is electrically connected to the second electrode.

3. An electric double layer capacitor, comprising:
   an electrode body comprising a separator formed between a pair of electrodes;
   an electrolyte;
   a concave-shaped container for containing the electrode body and the electrolyte; and
   a sealing plate for sealing an opening part of the container, the sealing plate having a plate shape comprising an upper surface, a lower surface and side surfaces, the side surfaces of the sealing plate are bonded, via a first metal layer, to an inner surface of the concave-shaped container, and
   wherein an undersurface of the sealing plate is bonded, via a second metal layer, to a current collector formed on one of the pair of electrodes.

4. The capacitor of claim 3, wherein the container is made of ceramics.

5. The capacitor of claim 3, wherein the sealing plate is made of a metal.

6. The capacitor of claim 5, wherein a part of the side surfaces of the sealing plate is exposed from the container.

7. The capacitor of claim 6, wherein a meeting part of an internal surface and the upper surface of the container is formed in a tapered shape.

8. The capacitor of claim 3,
   further comprising an external connecting terminal placed on a surface of the wall portion of the container;
   wherein the terminal penetrates the wall portion, and is electrically connected to the one of the electrodes of the pair of the electrodes.

9. The capacitor of claim 8, wherein
   the first metal layer formed on an internal surface of the container,
   wherein the sealing plate is fitted to the container so that the side surfaces of the sealing plate contact the first metal layer, and
   the external connecting terminal, the first metal layer and the second metal layer are electrically connected.

10. The capacitor according to claim 3, further comprising:
    a first electrode, a second electrode, a first external connection terminal and a second external connection terminal,
    wherein the first electrode and the second electrode constitute the pair of electrodes,
    wherein the first external connection terminal and the second external connection terminal are formed on an external side surface of the container,
    wherein the first external connection terminal and the second external connection terminal penetrates through a side wall of the container and extends to an internal side surface of the container,
    wherein the first external connection terminal is electrically connected to the sealing plate at the internal side surface of the container, and
    wherein the first external connection terminal is electrically connected to the first electrode and the second external connection terminal is electrically connected to the second electrode.

* * * * *